United States Patent
Iwano et al.

(10) Patent No.: US 11,346,386 B2
(45) Date of Patent: May 31, 2022

(54) JOINING METHOD AND JOINING APPARATUS

(71) Applicant: Toyota Jidosha Kabushiki Kaisha, Toyota (JP)

(72) Inventors: Yoshihiro Iwano, Toyota (JP); Kosuke Sakurai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 16/915,337

(22) Filed: Jun. 29, 2020

(65) Prior Publication Data

US 2020/0325929 A1    Oct. 15, 2020

Related U.S. Application Data (62) Division of application No. 15/946,822, filed on Apr. 6, 2018, now Pat. No. 10,760,607.

(30) Foreign Application Priority Data

Apr. 10, 2017   (JP) .............................. JP2017-077687

(51) Int. Cl.
*B23P 19/06* (2006.01)
*F16B 25/00* (2006.01)
(Continued)

(52) U.S. Cl.
CPC ........ *F16B 25/0031* (2013.01); *B21D 39/034* (2013.01); *B21J 5/066* (2013.01);
(Continued)

(58) Field of Classification Search
CPC .... B21D 39/034; B23P 19/06; F16B 25/0031; F16B 25/106; Y10T 29/49833;
(Continued)

(56) References Cited

U.S. PATENT DOCUMENTS

| 5,230,137 A | 7/1993 | Abe |
| 5,361,478 A | 11/1994 | Grossberndt et al. |

(Continued)

FOREIGN PATENT DOCUMENTS

| CN | 104684680 A | 6/2015 |
| DE | 10348427 A1 | 5/2005 |

(Continued)

OTHER PUBLICATIONS

Notice of Allowance dated Jul. 15, 2020 in U.S. Appl. No. 15/946,822.
(Continued)

*Primary Examiner* — Jermie E Cozart
(74) *Attorney, Agent, or Firm* — Dinsmore & Shohl LLP (57) ABSTRACT

A joining method is a method of joining a plate set composed by a plurality of stacked plate members including a first plate member and a second plate member by using a tapping screw. When the tapping screw is advanced into the plate set while the tapping screw is rotated in a state of applying a pressure onto the plate set so as to form through-holes in the first plate member and the second plate member, a first pressure applied onto the tapping screw is reduced down to a second pressure at the time when the tapping screw penetrates the first plate member.

12 Claims, 7 Drawing Sheets

(51) Int. Cl.
*F16B 5/02* (2006.01)
*F16B 25/10* (2006.01)
*B21J 5/06* (2006.01)
*B21D 39/03* (2006.01)

(52) U.S. Cl.
CPC ............... *B23P 19/06* (2013.01); *F16B 5/02* (2013.01); *F16B 5/0208* (2013.01); *F16B 25/00* (2013.01); *F16B 25/106* (2013.01); *Y10T 29/4978* (2015.01); *Y10T 29/49766* (2015.01); *Y10T 29/49767* (2015.01); *Y10T 29/49771* (2015.01); *Y10T 29/49776* (2015.01); *Y10T 29/49778* (2015.01); *Y10T 29/49833* (2015.01); *Y10T 29/49835* (2015.01); *Y10T 29/49837* (2015.01); *Y10T 29/5307* (2015.01); *Y10T 29/5343* (2015.01); *Y10T 29/53061* (2015.01); *Y10T 29/53078* (2015.01); *Y10T 403/4974* (2015.01)

(58) Field of Classification Search
CPC ......... Y10T 29/49835; Y10T 29/49837; Y10T 29/49776; Y10T 29/49778; Y10T 29/4978; Y10T 29/5343; Y10T 29/53061; Y10T 29/53078; Y10T 29/5307
See application file for complete search history.

(56) References Cited

U.S. PATENT DOCUMENTS

| | | |
|---|---|---|
| 5,439,331 A | 8/1995 | Andrew et al. |
| 9,175,708 B2 | 11/2015 | Werthwein |
| 2013/0195579 A1 | 8/2013 | Freis |
| 2015/0174714 A1 | 6/2015 | Somnitz et al. |
| 2015/0328676 A1 | 11/2015 | Zinn et al. |
| 2015/0328677 A1 | 11/2015 | Pfeiffer et al. |

FOREIGN PATENT DOCUMENTS

| | | |
|---|---|---|
| JP | H05302861 A | 11/1993 |
| JP | H08039352 A | 2/1996 |
| JP | 2006-177438 A | 7/2006 |

OTHER PUBLICATIONS

U.S. Appl. No. 15/946,822, filed Apr. 6, 2018, Yoshihiro Iwano et al.

RELATED ART

FIG. 9

RELATED ART

JOINING METHOD AND JOINING APPARATUS

CROSS-REFERENCE TO RELATED APPLICATIONS

This application is a Divisional Patent Application of U.S. patent application Ser. No. 15/946,822 filed Apr. 6, 2018, which claims priority to Japanese Patent Application No. 2017-077687 filed on Apr. 10, 2017, which is incorporated herein by reference in its entirety including the specification, drawings and abstract.

BACKGROUND

1. Technical Field

The present disclosure relates to a joining method and a joining apparatus to join a plate set composed by a plurality of stacked plate members by using a tapping screw.

2. Description of Related Art

As a method of joining plate members by using a tapping screw, there has been known a method of screwing a tapping screw into metallic members so as to form a through-hole through the metallic members and provide this through-hole with a female thread, to thereby fasten the metallic members to each other (for example, see Japanese Patent Application Publication No. 2006-177438).

SUMMARY

In the meantime, when a through-hole is formed through a plurality of plate members by applying a pressure from one direction (from one side) with a tapping screw, in order to penetrate the first plate member, it is required to set a pressurizing force corresponding to the total thickness of all the plate members.

In the joining method of the related art, during the process of forming the through-hole through the plurality of plate members, a pressurizing force (a pressurizing force corresponding to the total thickness of the all plate members) is set to be constant. Hence, when the tapping screw is driven into a portion with a smaller rigidity in the plate member, this plate member might be plastically deformed.

Figure 8:
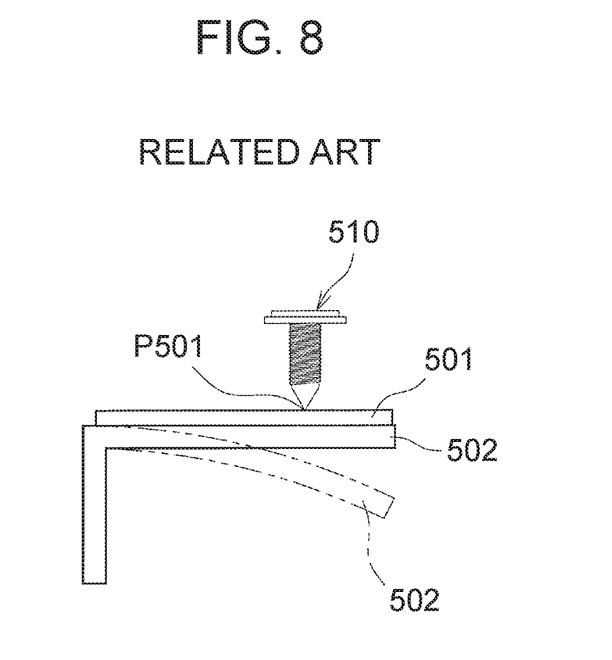
FIG. 8 is a view explaining a problem caused in the case of joining a plate member to be joined to a flange (plate member)
Figure 9:
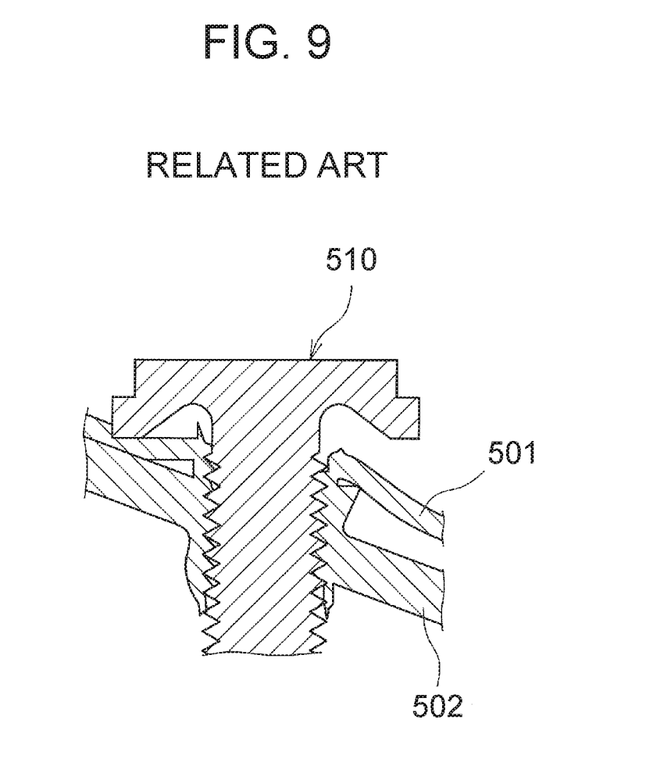
FIG. 9 is a sectional view showing the case in which the state after the joining is unacceptable.

FIG. 8 shows an outstanding example of plastic deformation of a plate member. As shown in this FIG. 8, in a state in which a plate to be joined 501 (hereinafter, also referred to as an upper plate 501) is stacked on a flange 502, a tapping screw 510 is driven into the upper plate 501 and the flange 502 from one direction. At this time, in the case in which a driving position P501 of the tapping screw 510 is located apart from a base of the flange 502, when a through-hole is formed in the flange 502 with a constant pressurizing force even after the tapping screw 510 penetrates the upper plate 501, plastic deformation (such as a deformation as indicated by a two-dot chain line in FIG. 8) might be caused to the flange 502. In such a situation, the joining might be unacceptable, as shown in FIG. 9.

The present disclosure provides a joining method and a joining apparatus capable of suppressing plastic deformation from being caused to the plate members, when a plate set composed by a plurality of stacked plate members is joined by using a tapping screw.

The first aspect of the present disclosure relates to a joining method of joining a plate set by using a tapping screw, the plate set being composed by a plurality of plate members that are stacked including a first plate member and a second plate member. The joining method includes: forming a first through-hole in the first plate member of the plate set and a second through-hole in the second plate member of the plate set by advancing the tapping screw into the plate set in an order of the first plate member and the second plate member while rotating the tapping screw in a state of applying a pressure onto the plate set from one side by the tapping screw; and forming the first through-hole and the second through-hole with female threads, and joining the first plate member and the second plate member to each other. In such a joining method, when the tapping screw penetrates the first plate member, a first pressure applied onto the tapping screw in an axial direction of the tapping screw is reduced down to a second pressure that is smaller than the first pressure.

According to the first aspect of the present disclosure, when the tapping screw penetrates the plate member, the first pressure applied to the tapping screw is reduced down to the second pressure. By controlling the pressurizing force in this manner, it is possible to suppress plastic deformation of the plate member more than that in the case (the related art) in which the pressure applied to the tapping screw is set to be constant during the through-hole formation in the plate members. Through this, it is possible to join the plurality of plate members in a proper joining state.

In the first aspect of the present disclosure, the second pressure may be a pressure corresponding to plate thicknesses of all the plate members located more forward in an advancing direction of the tapping screw than a front end of the tapping screw at the time when the tapping screw penetrates the first plate member.

In the first aspect of the present disclosure, the first pressure may be a pressure corresponding to plate thicknesses of all the plate members.

In the first aspect of the present disclosure, the plurality of plate members may be composed by the first plate member and the second plate member, and the joining method may further include reducing the second pressure down to a third pressure that is smaller than the second pressure when the tapping screw penetrates the second plate member.

A second aspect of the present disclosure relates to a joining apparatus that joins a plate set by using a tapping screw, the plate set being composed by a plurality of plate members that are stacked including a first plate member and a second plate member. The joining apparatus includes: a driver configured to hold the tapping screw; a rotary section configured to rotate the driver around an axial center thereof; a pressurizing section configured to apply a pressure in an axial direction of the driver onto the driver; a positional information acquiring section configured to acquire positional information on a front end of the tapping screw held by the driver; and a controller, wherein the joining apparatus advances the tapping screw into the plate set in an order of the first plate member and the second plate member while the tapping screw held by the driver is rotated in a state of applying a pressure onto the plate set from one side by the tapping screw so as to form a first through-hole in the first plate member and a second through-hole in the second plate member, form the first through-hole and the second through-hole with female threads, and join the first plate member and the second plate member to each other.

Based on the positional information on the front end of the tapping screw acquired by the positional information acquiring section, the controller is configured to execute the control to reduce a first pressure applied to the driver by the pressurizing section down to a predetermined second pressure when the front end of the tapping screw has moved from the position where the front end of the tapping screw comes into contact with a surface of the first plate member of the plate set by a distance corresponding to the plate thickness of the first plate member.

In the second aspect of the present disclosure, when the front end of the tapping screw has moved from the position where the front end of the tapping screw comes into contact with the surface of the first plate member of the plate set by a distance equal to the plate thickness of the first plate member, it can be said that the tapping screw penetrates the plate member. In the joining apparatus of the present disclosure, when the front end of the tapping screw has moved from the position where the front end of the tapping screw comes into contact with the surface of the first plate member of the plate set by a distance equal to the plate thickness of the first plate member, the first pressure generated by the pressurizing section is reduced down to the predetermined second pressure; therefore, it is possible to suppress plastic deformation of the plate member more than that in the case (the related art) in which the pressure applied to the tapping screw is set to be constant during the process of forming the through-hole through the plurality of plate members. Accordingly, it is possible to join the plurality of plate members in a proper joining state.

In the second aspect of the present disclosure, the positional information acquiring section may have a distance sensor that detects a movement distance of the driver in an advancing direction of the tapping screw. The positional information acquiring section may be configured to acquire positional information on the front end of the tapping screw based on an output of the distance sensor.

In the second aspect of the present disclosure, the positional information acquiring section may have a force sensor that detects a reaction force generated when the front end of the tapping screw comes into contact with the surface of the first plate member. The positional information acquiring section may be configured to acquire the positional information on the front end of the tapping screw based on an output of the force sensor.

In the second aspect of the present disclosure, the second pressure may be a pressure corresponding to plate thicknesses of all the plate members located more forward in the advancing direction of the tapping screw than the front end of the tapping screw when the tapping screw penetrates the first plate member.

In the second aspect of the present disclosure, the first pressure may be a pressure corresponding to plate thicknesses of all the plate members.

In the second aspect of the present disclosure, the plurality of plate members may be composed by the first plate member and the second plate member, and the controller may be configured to reduce the second pressure down to a third pressure that is smaller than the second pressure when the tapping screw penetrates the second plate member.

In this manner, by configuring such that the positional information on the tapping screw is obtained based on the output of the distance sensor that detects the movement distance of the driver, even in the case of holding the tapping screw having a different length (length beneath the head) to the driver, it is possible to acquire the positional information on the front end of the tapping screw by using only one distance sensor.

According to the joining method and the joining apparatus of the present disclosure, it is possible to suppress plastic deformation from being caused to the plate members when the plate set composed by the plurality of stacked plate members is joined by using the tapping screw.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, embodiments of the present disclosure will be described based on the drawings.

[Tapping Screw]

Figure 1:
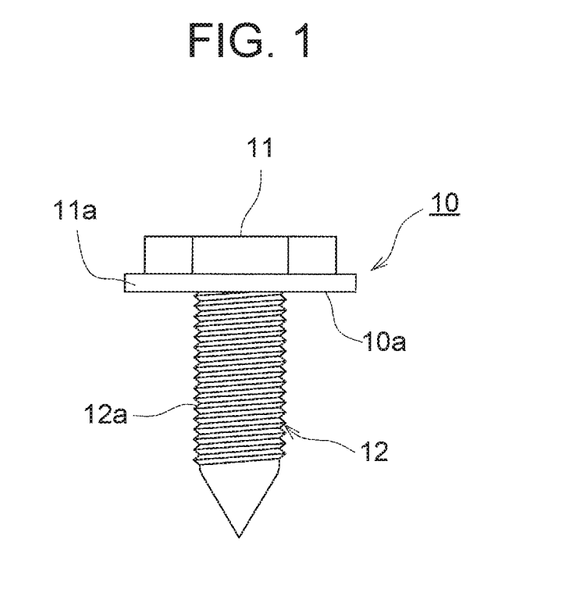
FIG. 1 is a view showing a structure of a tapping screw.

Description will be started with a tapping screw used in the present embodiment. As shown in FIG. 1, the tapping screw 10 is a tapping screw having a front end provided with no drill, and includes a head portion 11, and a shaft portion 12 formed with a screw 12a, which are integrally formed. The head portion 11 is integrally formed with a flange 11a, and a surface (lower surface) on the shaft portion 12 side of this flange 11a composes a seat surface 10a of the tapping screw 10.

[Joining Apparatus]

Next, one example of the joining apparatus to which the present disclosure is applied will be described with reference to FIG. 2.

Figure 2:
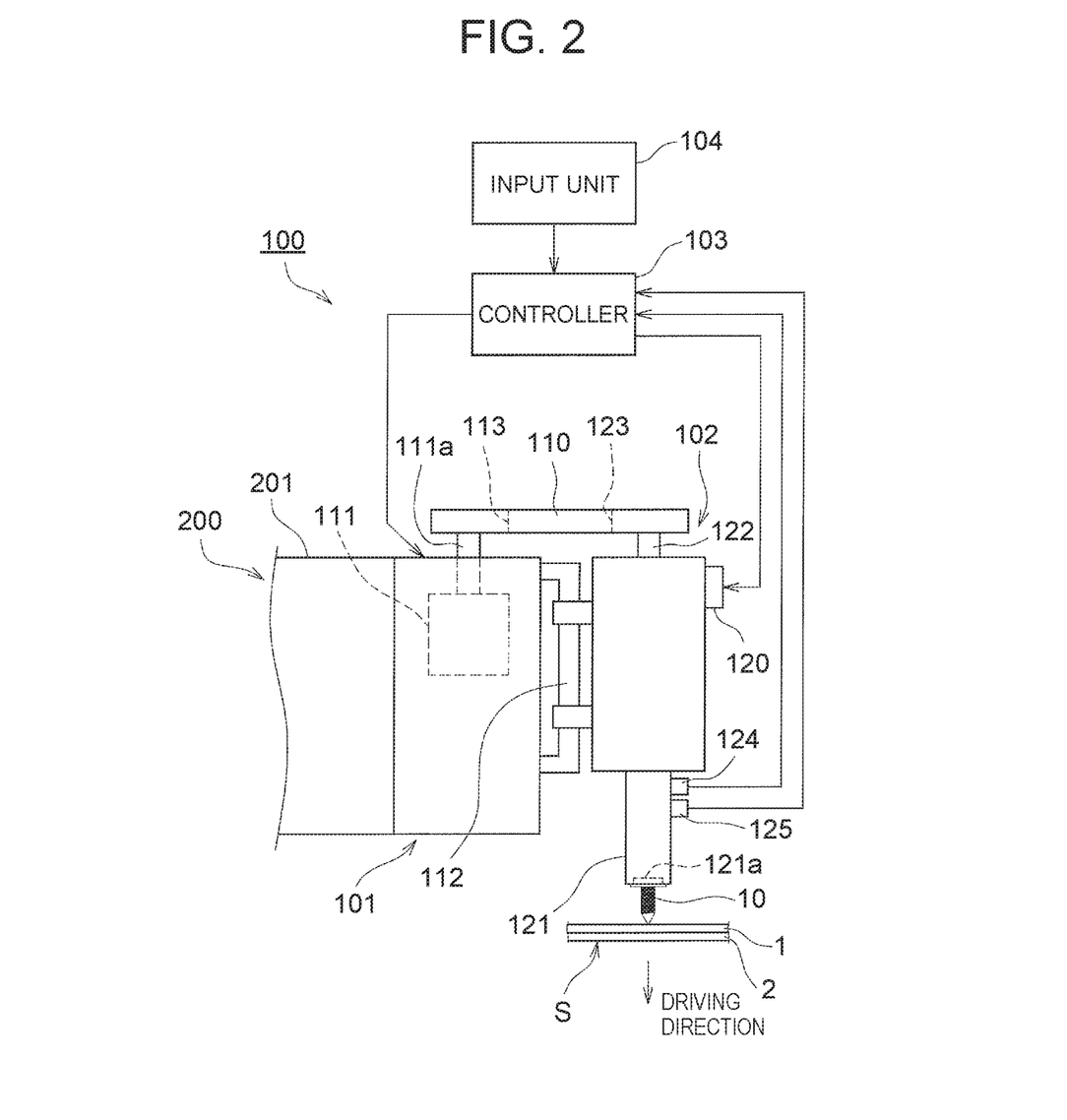
FIG. 2 is a schematic configuration view showing one example of a joining apparatus of the present disclosure.

The joining apparatus 100 shown in FIG. 2 includes a rotary mechanism 101, a pressurizing mechanism 102, a controller 103, and an input unit 104, etc.

The rotary mechanism 101 is attached to a front end of an arm 201 of a robot 200. The rotary mechanism 101 includes a motor (e.g., a servo motor) 111, and a rotary shaft 111a of this motor 111 protrudes to the outside (in the upward direction in FIG. 1). A support shaft 112 is provided to a lateral part of the rotary mechanism 101. The rotary mechanism is one example of "rotary section" of the present disclosure.

The pressurizing mechanism 102 is an air cylinder, and is supported by the support shaft 112 of the rotary mechanism 101. The pressurizing mechanism 102 includes a driver 121 located at a lower position and a rotary drive shaft 122 located at an upper position in FIG. 2. The rotary drive shaft 122 is disposed in parallel to a rotary shaft 111a of a motor 111 of the rotary mechanism 101.

The driver 121 is connected to a piston (not illustrated) inside the cylinder. The driver 121 and the rotary drive shaft 122 are spline-connected to each other (not illustrated), for example, so that the driver 121 is integrally rotatable with the rotary drive shaft 122. In addition, the driver 121 is movable in the axial direction (the vertical direction in the state shown in FIG. 1) relative to the rotary drive shaft 122.

A front end of the driver 121 is provided with a socket hole (a recessed portion with a hexagonal section) 121a into which a head portion (in a hexagon shape) 11 of the tapping screw 10 shown in FIG. 1 is fitted. A front end portion of the driver 121 is provided with a chuck (not illustrated) to hold the tapping screw 10 fitted in the socket hole 121a. This chuck is configured to be detached from the tapping screw 10 when the front end of the tapping screw 10 comes into contact with a plate member to be joined (an upper plate 1).

The rotary mechanism 101 includes a force sensor 124 to detect a force acting in the axial direction of the driver 121, and a distance sensor 125 to detect a movement distance in the axial direction of the driver 121 (a movement distance in the advancing direction of the tapping screw 10). Respective outputs of the force sensor 124 and the distance sensor 125 are inputted into the controller 103.

A pulley (a driven pulley) 123 is attached to the rotary drive shaft 122 of the pressurizing mechanism 102 in an integrally rotatable manner. A belt 110 is wound between the pulley 123 of the rotary drive shaft 122 and a pulley (a driving pulley) 113 attached to the rotary shaft 111a of the motor 111 of the rotary mechanism 101 in an integrally rotatable manner, so that the rotary drive shaft 122 is rotated by driving of the motor 111. Due to the rotation of this rotary drive shaft 122, the driver 121 is rotated around its axis. The driving of the motor 111 of the rotary mechanism 101 is controlled by the controller 103.

In addition, the pressurizing mechanism 102 is supplied with air from an air supply source (e.g. a not-illustrated compressor) via an air controller 120. By controlling the air supply to the pressurizing mechanism 102, the driver 121 moves in a driving direction, or retreats in an inverse direction to the driving direction. This control of the air supply is carried out by an air controller 120 and the controller 103. Note that the pressurizing mechanism 102 is one example of "pressurizing section" of the present disclosure.

[Controller]

The controller 103 includes a CPU (central processing unit), a ROM (read only memory) that stores programs to control respective components, a RAM (random access memory) that temporally stores data, and an input-output interface, and others.

The CPU is configured to execute arithmetic processing based on programs and data stored on the ROM. The ROM stores the programs and the date for controlling. The RAM temporally stores arithmetic results obtained by the CPU. The motor 111 of the rotary mechanism 101, an air controller 120, the force sensor 124, the distance sensor 125, the input unit 104, and the others are connected to the input-output interface.

The controller 103 controls the rotary mechanism 101 and the pressurizing mechanism 102 in the joining process of the plate members.

[Joining Process]

Next, one example of the joining process will be described with reference to FIG. 2 to FIG. 5. In this example, as shown in FIG. 4A to FIG. 4F, a tapping screw 10 is driven from one direction (one side) into a plate set S composed by the plate member to be joined (the steel plate) 1 and a flange (a steel plate) 2 on which the plate member to be joined 1 is stacked, to thereby join the plate member to be joined 1 and the flange 2 to each other. In the following description, the plate member to be joined 1 is also referred to as the upper plate 1, and the flange 2 is also referred to as a lower plate 2.

(Pre-Treatment)

First, a pressurizing force is found based on a plate thickness t1 and the material of the upper plate 1 and a plate thickness t2 and the material of the lower plate 2. Specifically, for example, because the joining manner treated as the subject of the present disclosure is in the case of using the plate member that is easily plastically deformable, or in a state in which the plate member is fixed on one side so as to be easily plastically deformable (the state as shown in FIG. 8, for example), it is necessary to consider the respective plate thicknesses and the respective materials of the upper plate 1 and the lower plate 2. Hence, based on the total plate thickness (t1+t2) of the upper plate 1 and the lower plate 2 and the materials thereof, a pressurizing force W1 required for the tapping screw to penetrate the upper plate 1 with the upper plate 1 staked on the lower plate 2 (the pressurizing force corresponding to the total plate thickness (t1+t2)) is found. In addition, based on the plate thickness t2 of the lower plate 2 and the material thereof, a pressurizing force W2 (W2<W1) required for the tapping screw to penetrate the lower plate 2 is found.

The input unit 104 is operated so as to input, into the controller 103, the plate thickness t1 of the upper plate 1, the plate thickness t2 of the lower plate 2, the pressurizing force W1 corresponding to the above total plate thickness, the pressurizing force W2 required for penetration through the lower plate 2, and a pressurizing force W3 used when the tapping is carried out in the through-holes (the female-thread formation). The respective plate thicknesses t1, t2, and the respective pressurizing forces W1, W2, W3 that have been inputted are all stored on the RAM of the controller 103.

Next, as shown in FIG. 2, the tapping screw 10 is held by the driver 121 of the pressurizing mechanism 102 of the joining apparatus 100. Thereafter, the robot 200 is operated so as to place the front end of the tapping screw 10 onto a driving position P1 shown in FIG. 4A. In this state, the position of the arm 201 of the robot 200 (the position of the rotary mechanism 101) is fixed. In this setting state, the axial center of the tapping screw 10 (the driving direction) is disposed vertically to the upper plate 1.

After such a pre-treatment is carried out, the following joining process (ST101 to ST105) is executed. In the following joining process, the driving control on the motor 111 of the rotary mechanism 101 based on the respective outputs of the force sensor 124 and the distance sensor 125, the air supply control on the pressurizing mechanism 102, and others are executed by the controller 103.

(ST101)

The air supply for the pressurizing mechanism 102 is controlled so as to advance the driver 121 toward the upper plate 1, and detect the position of a surface (an upper surface) 1a of the upper plate 1. Specifically, when the front end of the tapping screw 10 comes into contact with the surface 1a of the upper plate 1 due to the advance of the driver 121 (see FIG. 4A), a reaction force is generated, and thus the output of the force sensor 124 is changed. Therefore, based on the position of the driver 121 at the time when the output of the force sensor 124 is changed (the position of the driver 121 obtained from the output of the distance sensor 125), the position of the surface 1a of the upper plate 1 (hereinafter, also referred to as a surface position) is detected. The position of the driver 121 at the time when the surface position of the upper plate 1 is detected is set as a reference position.

(ST102)

Figure 4A:
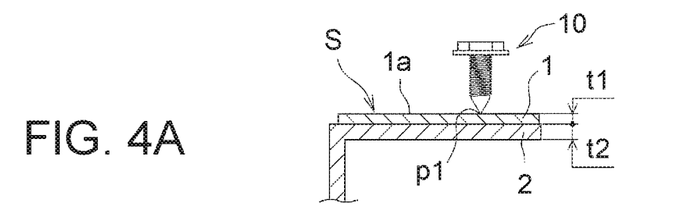
FIG. 4A is a sectional view showing a state in the joining process.
Figure 4B:
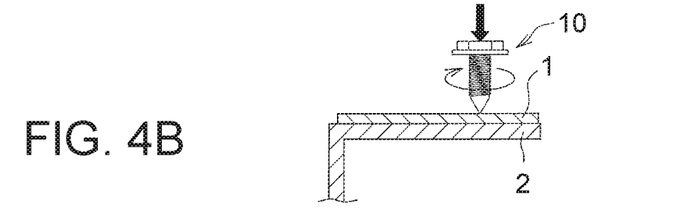
FIG. 4B is a sectional view showing another state in the joining process.
Figure 5:
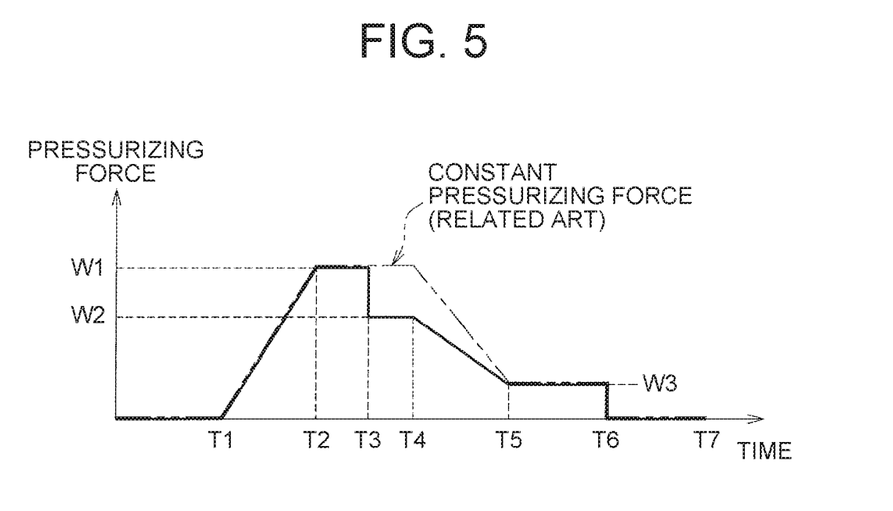
FIG. 5 is a timing chart showing one example of a control on a pressurizing force.
Figure 6:
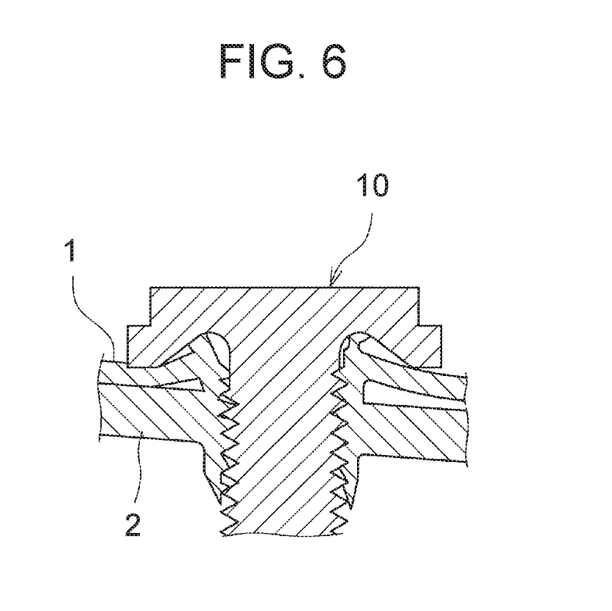
FIG. 6 is a sectional view showing a state after the joining.

From the state shown in FIG. 4A, that is, the state in which the front end of the tapping screw 10 is in contact with the surface 1a of the upper plate 1, the driver 121 is rotated and advanced toward the driving direction by the driving control on the motor 111 of the rotary mechanism 101 and the supplied-air control on the pressurizing mechanism 102, as shown in FIG. 4B, while being rotated around its axial center, the tapping screw 10 is pressurized against the upper plate 1 from one direction (T1 to T2 in FIG. 5). During this pressurizing process, at the time (the time of T2 in FIG. 5) when a force obtained from the output of the force sensor 124 (the pressurizing force onto the upper plate 1) becomes the pressurizing force W1 that is previously inputted (the pressurizing force corresponding to the total plate thickness (t1+t2)), the air supply for the pressurizing mechanism 102 is controlled so as to maintain the pressurizing force at the pressurizing force W1. In this manner, by applying the pressurizing force W1 onto the upper plate 1 while the tapping screw 10 is rotated, the upper plate 1 is pre-heated, and the front end of the tapping screw 10 is brought to advance into the upper plate 1 by the pressurizing force W1. The through-hole formation in the upper plate 1 is carried out by this advance of the tapping screw 10 into the upper plate 1.

(ST103)

Figure 4C:
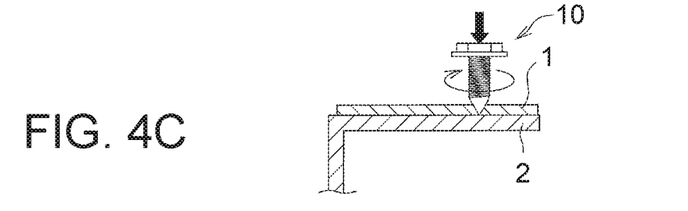
FIG. 4C is a sectional view showing another state in the joining process.

When the front end of the tapping screw 10 penetrates the upper plate 1 (when the front end of the tapping screw 10 comes into the state shown in FIG. 4C), the pressurizing force is reduced. Specifically, based on the output of the distance sensor 125, when it is detected that the driver 121 (the front end of the tapping screw 10) has moved by a distance equal to the plate thickness t1 of the upper plate 1, from the reference position (the position that the front end of the tapping screw 10 comes into contact with the surface 1a (one surface) of the upper plate 1) defined in the above step ST101, that is, when the front end of the tapping screw 10 penetrates the upper plate 1 (at the time of T3 in FIG. 5), the pressurizing force generated by the pressurizing mechanism 102 is reduced down to the predetermined pressurizing force W2 that is required for the penetration through the lower plate 2 (the pressurizing force corresponding to the plate thicknesses of the plate members located in the advancing direction of the tapping screw) (W1 to W2). Thereafter, the through-hole is formed in the lower plate 2 while the pressurizing force W2 is maintained.

(ST104)

Figure 4D:
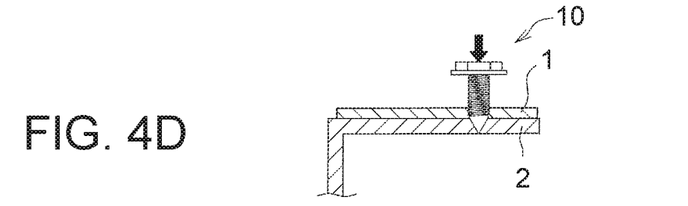
FIG. 4D is a sectional view showing another state in the joining process.
Figure 4E:
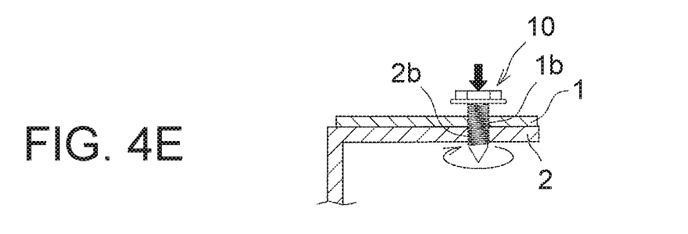
FIG. 4E is a sectional view showing another state in the joining process.
Figure 4F:
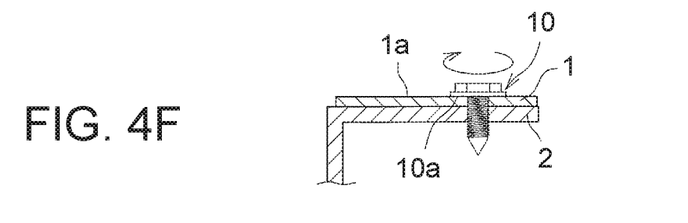
FIG. 4F is a sectional view showing another state in the joining process.

The pressurizing force is reduced when the front end of the tapping screw 10 penetrates the lower plate 2 (when the front end of the tapping screw 10 comes into the state in FIG. 4D). Specifically, based on the output of the distance sensor 125, when it is detected that the driver 121 (the front end of the tapping screw 10) has moved by a distance equal to the total plate thickness (t1+t2) of the upper plate 1 and the lower plate 2, from the reference position defined in the above step ST101, that is, when the front end of the tapping screw 10 penetrates the lower plate 2, the pressurizing force generated by the pressurizing mechanism 102 is reduced (T4 to T5 in FIG. 5). Thereafter, while the pressurizing force is set to be the pressurizing force W3 required for the tapping, the tapping (the female-thread formation) is carried out in a through-hole 1b of the upper plate 1 and a through-hole 2b of the lower plate 2, as shown in FIG. 4E (T5 to T6 in FIG. 5).

(ST105)

After the tapping is carried out in the through-hole 1b of the upper plate 1 and the through-hole 2b of the lower plate 2, at the time when the seat surface 10a of the tapping screw 10 is seated on the surface (the upper surface) of the upper plate 1 (FIG. 4F), the pressurizing force is released and a fastening torque is applied onto the tapping screw 10, thereby to fasten the upper plate 1 and the lower plate 2 to each other (T6 to T7 in FIG. 5).

Figure 3:
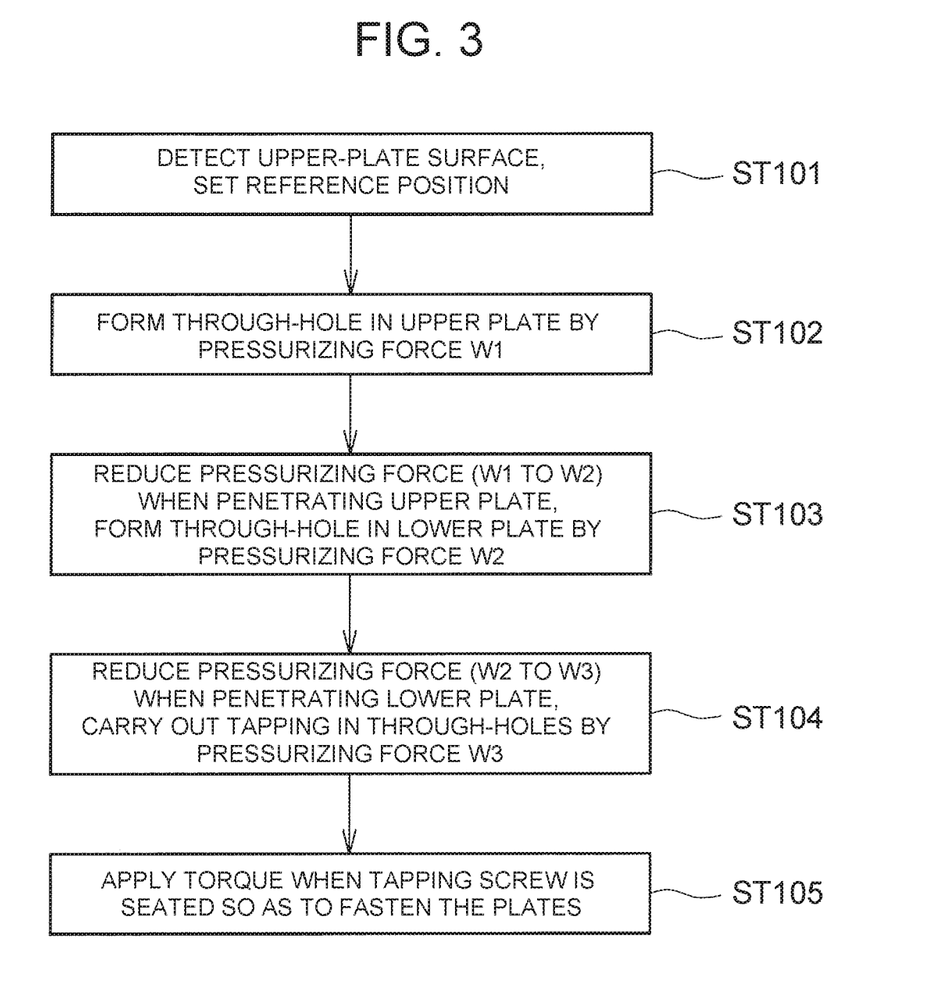
FIG. 3 is a view showing a flow of a joining process.

The steps ST101 to ST105 in FIG. 3 are executed by the controller 103, to thereby embody "position information acquiring section" and "controller" of the present disclosure.

<Effects>

Figure 7:
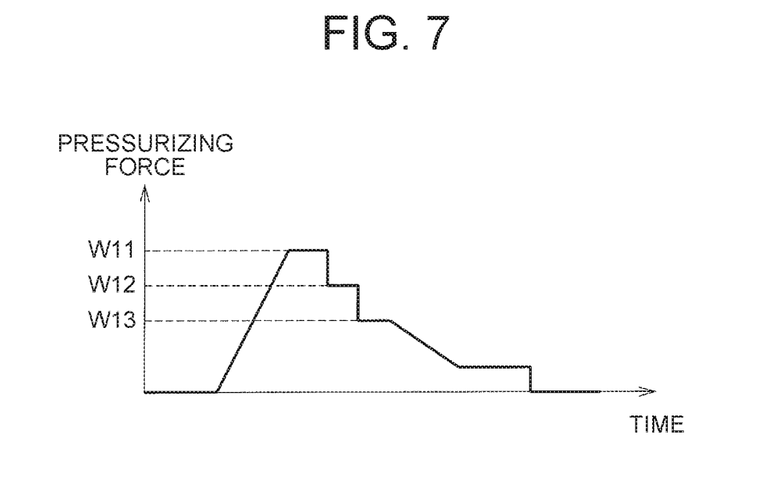
FIG. 7 is a timing chart showing another example of the control on the pressurizing force.

As aforementioned, according to the present embodiment, when the tapping screw 10 is advanced while the tapping screw 10 is rotated in the state of applying the pressure force onto the plate set S from one direction so as to form the through-holes 1b, 2b in the upper plate 1 and the lower plate 2 of the plate set S, at the time when the front end of the tapping screw 10 penetrates the upper plate 1, the pressurizing force generated by the pressurizing mechanism 102 is reduced down to the pressurizing force W2 corresponding to the plate thickness t2 of the lower plate 2 (W1 to W2). By controlling the pressurizing force in this manner, it is possible to suppress plastic deformation of the lower plate 2 more than that in the case of controlling the pressure applied onto the tapping screw to be constant (the related art), during the through-hole formation in the plate members. With this configuration, as shown in FIG. 3, even if the driving position P1 of the tapping screw 10 is located apart from a base of the flange, it is possible to suppress the plastic deformation of the lower plate 2, and thus, as shown in FIG. 7, it is possible to join the upper plate 1 and the lower plate 2 to each other in a proper joining state.

Other Embodiments

Note that the embodiments disclosed herein are intended to be illustrative in all respects and should not be construed as the basis for restrictive interpretations. Therefore, the technical scope of the present disclosure is not intended to be interpreted based on only the above-described embodiments, but rather is defined based on the description in the claims. Moreover, all changes within meanings and scopes equivalent to the claims are embraced by the technical scope of the present disclosure.

In the above embodiments, the case of joining the plate to be joined to the flange (the case of driving the tapping screw into the portion of the plate member having a smaller rigidity) has been described, but the present disclosure is not limited to this, and the present disclosure is also applicable to any other manner as far as the joining is for the plate set composed by a plurality of stacked plate members.

In the above embodiments, the example of applying the present disclosure to the case in which the two plate members (the upper plate 1 and the lower plate 2) are joined to each other has been described, but the present disclosure is not limited to this, and is also applicable to the case in which three or more plate members are joined.

For example, in the case of joining a plate set composed by three stacked plate members of an upper plate, an middle plate, and a lower plate, as shown in FIG. 7, the pressurizing force for forming the through-hole in the first plate member (the upper plate) located in the driving direction of the tapping screw is set to be a pressurizing force W11 corresponding to the total plate thickness of the three plate members. Next, when the tapping screw penetrates the upper plate, the pressurizing force is reduced down to a pressurizing force W12 corresponding to the plate thicknesses (the total plate thickness) of the two plate members (the middle, the lower plate) located in the advancing direction of the tapping screw (W11 to W12). When the tapping screw penetrates the middle plate, the pressurizing force is reduced down to a pressurizing force W13 corresponding to the plate thickness of one plate member (the lower plate) located in the advancing direction of the tapping screw (W12 to W13).

In this manner, every time the tapping screw penetrates each plate member, the pressurizing force is reduced, to thereby reduce the pressurizing force stepwise during the advance of the tapping screw, depending on the plate thicknesses of the plate members located in the advancing direction of the tapping screw. Through this, when the plate set composed by the three plate members is joined, it is possible to more effectively suppress the plastic deformation of the plate members.

In addition, in the joining apparatus 100 shown in FIG. 2, for example, in the case of joining the plate set of the three stacked plate members including the upper plate, the middle plate, and the lower plate, when the front end of the tapping screw 10 has moved due to the advance of the driver 121, from a position where the front end of the tapping screw 10 comes into contact with one surface of the upper plate by a distance equal to the plate thickness (when the front end of the tapping screw 10 penetrates the upper plate), the pressurizing force is reduced down to a pressurizing force corresponding to plate thicknesses of the two plates, that is, the middle plate and the lower plate. Next, due to the advance of the driver 121, when the front end of the tapping screw 10 has moved from a position where the front end of the tapping screw 10 comes into contact with one surface of the middle plate by a distance equal to the plate thickness (when the front end of the tapping screw 10 penetrates the middle plate), there may be executed a control to reduce the pressurizing force down to a pressurizing force required for the penetration through the lower plate. The present disclosure is applicable to the case of joining four or more plate members.

In the aforementioned embodiments, with respect to the detection of the position of the surface of the upper plate 1, the position of the surface of the upper plate 1 is detected by detecting a reaction force generated when the front end of the tapping screw 10 comes into contact with the surface of the upper plate 1 by using the force sensor 124; but the present disclosure is not limited to this. For example, the position of the surface of the upper plate 1 may be detected by using a non-contact-type sensor with a laser light, an infrared light, etc., or by using a contact-type sensor with a cantilever, or the like.

In the aforementioned embodiments, the distance sensor to detect the movement distance of the driver is provided so as to obtain the positional information on the front end of the tapping screw based on the output from the distance sensor, but the present disclosure is not limited to this. There may be provided a sensor to detect the position of the front end of the tapping screw so as to obtain the positional information on the front end of the tapping screw based on the output from this sensor.

In the aforementioned embodiments, the air cylinder is used as the pressurizing mechanism of the joining apparatus; but the present disclosure is not limited to this, and as the pressurizing mechanism, there may be used a mechanism in combination of a motor (such as a servo motor) and a rotation-to-translation conversion mechanism (such as a ball screw), or another actuator such as a hydraulic cylinder.

In the aforementioned embodiments, the example of using the tapping screw 10 whose head portion 11 has a hexagonal shape is described, but the manner of the head portion of the tapping screw is not limited to a specific one, and for example, and may be applicable to the case of joining the plate members using a tapping screw having a head portion with a cross recess.

In the aforementioned embodiments, the case of applying the present disclosure to the joining of the steel plates is described, but the present disclosure is not limited to this, and may be applicable to joining of metallic plate members other than steel plates, or plate members made of resin.

The present disclosure is effectively usable in the joining method of joining the plate set composed by the plurality of stacked plate members by using the tapping screw.

What is claimed is:

1. A joining apparatus that joins a plate set by using a tapping screw, the plate set being composed by a plurality of plate members that are stacked including a first plate member and a second plate member, the joining apparatus comprising:
   a driver configured to hold the tapping screw;
   a rotary section configured to rotate the driver around an axial center of the driver;
   a pressurizing section configured to apply a pressure in an axial direction of the driver onto the driver;
   a positional information acquiring section configured to acquire positional information on a front end of the tapping screw held by the driver; and
   a controller configured to execute a control to reduce a first pressure applied onto the driver by the pressurizing section down to a predetermined second pressure based on the positional information on the front end of the tapping screw acquired by the positional information acquiring section, when the front end of the tapping screw has moved from a position where the front end of the tapping screw comes into contact with a surface of the first plate member of the plate set by a distance corresponding to a plate thickness of the first plate member,
   wherein the joining apparatus advances the tapping screw into the plate set in an order of the first plate member and the second plate member while the tapping screw held by the driver is rotated in a state of applying a pressure onto the plate set from one side by the tapping screw so as to form a first through-hole in the first plate member and a second through-hole in the second plate member, form the first through-hole and the second through-hole with female threads, and join the first plate member and the second plate member to each other.

2. The joining apparatus according to claim 1, wherein
   the positional information acquiring section having a distance sensor that detects a movement distance of the driver in an advancing direction of the tapping screw, the positional information acquiring section being configured to acquire positional information on the front end of the tapping screw based on an output of the distance sensor.

3. The joining apparatus according to claim 1, wherein
the positional information acquiring section having a force sensor that detects a reaction force generated when the front end of the tapping screw comes into contact with the surface of the first plate member, the positional information acquiring section being configured to acquire the positional information on the front end of the tapping screw based on an output of the force sensor.

4. The joining apparatus according to claim 1, wherein
the second pressure is a pressure corresponding to plate thicknesses of all the plate members located more forward in an advancing direction of the tapping screw than the front end of the tapping screw when the tapping screw penetrates the first plate member.

5. The joining apparatus according to claim 1, wherein
the first pressure is a pressure corresponding to plate thicknesses of all the plate members.

6. The joining apparatus according to claim 1, wherein
the plurality of plate members are composed by the first plate member and the second plate member, and
the controller is configured to reduce the second pressure down to a third pressure that is smaller than the second pressure when the tapping screw penetrates the second plate member.

7. A joining apparatus that joins a plate set by using a tapping screw, the plate set being composed by a plurality of plate members that are stacked including a first plate member and a second plate member, the joining apparatus comprising:
a driver configured to hold the tapping screw;
a motor configured to rotate the driver around an axial center of the driver;
an air cylinder configured to apply a pressure in an axial direction of the driver onto the driver;
a distance sensor configured to acquire positional information on a front end of the tapping screw held by the driver; and
a controller configured to execute a control to reduce a first pressure applied onto the driver by the air cylinder down to a predetermined second pressure based on the positional information on the front end of the tapping screw acquired by the distance sensor, when the front end of the tapping screw has moved from a position where the front end of the tapping screw comes into contact with a surface of the first plate member of the plate set by a distance corresponding to a plate thickness of the first plate member,
wherein the joining apparatus advances the tapping screw into the plate set in an order of the first plate member and the second plate member while the tapping screw held by the driver is rotated in a state of applying a pressure onto the plate set from one side by the tapping screw so as to form a first through-hole in the first plate member and a second through-hole in the second plate member, form the first through-hole and the second through-hole with female threads, and join the first plate member and the second plate member to each other.

8. The joining apparatus according to claim 7, wherein
the distance sensor detects a movement distance of the driver in an advancing direction of the tapping screw, the distance sensor being configured to acquire positional information on the front end of the tapping screw based on an output of the distance sensor.

9. The joining apparatus according to claim 7, wherein
the distance sensor having a force sensor that detects a reaction force generated when the front end of the tapping screw comes into contact with the surface of the first plate member, the distance sensor being configured to acquire the positional information on the front end of the tapping screw based on an output of the force sensor.

10. The joining apparatus according to claim 7, wherein
the second pressure is a pressure corresponding to plate thicknesses of all the plate members located more forward in an advancing direction of the tapping screw than the front end of the tapping screw when the tapping screw penetrates the first plate member.

11. The joining apparatus according to claim 7, wherein
the first pressure is a pressure corresponding to plate thicknesses of all the plate members.

12. The joining apparatus according to claim 7, wherein
the plurality of plate members are composed by the first plate member and the second plate member, and
the controller is configured to reduce the second pressure down to a third pressure that is smaller than the second pressure when the tapping screw penetrates the second plate member.

* * * * *